(12) United States Patent
Feichtinger et al.

(10) Patent No.: US 6,394,129 B1
(45) Date of Patent: May 28, 2002

(54) DEVICE FOR PREVENTING A FUEL TANK TO BE OVERFILLED

(75) Inventors: Stefan Feichtinger, Anger; Sandor Palvolgyi, Ungerdorf, both of (AT)

(73) Assignee: Tesma Motoren-und Getriebetechnik Ges. M.B.H, Preding (AT)

( * ) Notice: Subject to any disclaimer, the term of this patent is extended or adjusted under 35 U.S.C. 154(b) by 0 days.

(21) Appl. No.: 09/555,238

(22) PCT Filed: Oct. 15, 1998

(86) PCT No.: PCT/AT98/00245
§ 371 (c)(1),
(2), (4) Date: Jul. 25, 2000

(87) PCT Pub. No.: WO99/28143
PCT Pub. Date: Jun. 10, 1999

(30) Foreign Application Priority Data

Nov. 27, 1997 (AT) ................................................ 2013/97

(51) Int. Cl.⁷ ............................................... F16K 17/36
(52) U.S. Cl. ...................... 137/587; 137/202; 137/433; 123/516; 123/519
(58) Field of Search ................................ 137/587, 202, 137/433; 123/516, 519; 251/174

(56) References Cited

U.S. PATENT DOCUMENTS

| 2,224,929 A | * | 12/1940 | Rose et al. ................... 137/202 |
| 3,084,706 A | * | 4/1963 | Lunde .......................... 137/202 |
| 4,163,456 A | * | 8/1979 | Herron ......................... 137/202 |
| 4,951,701 A | * | 8/1990 | Boehmer ...................... 137/199 |
| 5,573,030 A | * | 11/1996 | Ohsaki et al. ................. 137/43 |
| 5,640,989 A | * | 6/1997 | Nemoto et al. ................ 137/39 |

\* cited by examiner

*Primary Examiner*—A. Michael Chambers
(74) *Attorney, Agent, or Firm*—Bachman & LaPointe, P.C.

(57) ABSTRACT

Device for preventing the overfilling of a fuel tank (1) provided with a filler neck and a filling vent line (6), an operational vent line (11), which leads to the outside or to a collecting tank, opening into the fuel tank above the opening into the filling vent line, in which operational vent line there is connected a valve device (13) which is closed during filling of the fuel tank and is open in the remaining time, the valve device having a valve closing member (13') which can be engaged with a valve seat (19') in the direction leading away from the fuel tank, is preloaded into the open position and is bridged, at least in the blocked state, by a flow-restricting partial-flow path (14), the valve seat (19') for its part being movably mounted, forming a pressure relief valve clearance (25) with an inner shoulder (24) of the valve device (13), and being preloaded into the closed position and in the direction of the valve closing member (13').

5 Claims, 3 Drawing Sheets

DEVICE FOR PREVENTING A FUEL TANK TO BE OVERFILLED

The invention relates to a device for preventing the overfilling of a fuel tank provided with a filler neck and a filling vent line, an operational vent line, which leads to the outside or to a collecting tank, opening into the fuel tank above the opening into the filling vent line, in which operational vent line there is connected a valve device which is closed during filling of the fuel tank and is open in the remaining time.

A device of this type is disclosed in EP 0 464 420 or DE 43 43 498. In the known devices, the valve device for the operational vent line is fastened laterally at the upper end of the filler neck, and is displaced into the closed position via a valve actuating member, which projects into the end of the filler neck, by the fuel-pump nozzle, inserted for the filling-up, or by a filler neck closure flap which is knocked against by said fuel-pump nozzle. This solution is mechanically complicated and complicated to produce. In International Application No. PCT/AT 97/00177, which is not a prior publication, from the same applicant, a substantially simpler device with a design which is favorable in terms of cost has therefore already been proposed, in the case of which the valve device has a valve closing member which can be engaged with a valve seat in the direction leading away from the fuel tank, is preloaded into the open position and is bridged, at least in the blocked state, by a flow-restricting partial-flow path.

This type of valve device is a component which is completely separated from the end of the filler neck and is actuated solely by the operating pressures and/or gas flows which occur, and this does not require a complicated mechanical coupling with the engaging fuel-pump nozzle or the closure flap, or pressure diaphragm. The flow restriction in the partial-flow path is selected to be so large that the overpressure building up in the end phase of the filling-up in the tank space above the opening of the filling vent line is not substantially reduced within that time period in which an average user would be tempted to refuel. It is therefore ensured that the tank space above the filling vent line is not significantly filled up with fuel during refueling. Only some time after the conclusion of the refueling operation is the pressure slowly reduced via the partial-flow path, as a result of which any fuel from the filler neck runs back into the tank while slightly filling the tank space above the opening of the filling vent line. As soon as the pressure gradient via the partial-flow path undershoots a prescribed value, the valve device opens and releases a substantially larger flow cross section than the partial-flow path, this flow cross section permitting normal aeration and ventilation during operation. No noteworthy gas flow occurs via the valve device during driving operation, with the result that said valve device remains open and renders it possible for pressure fluctuations in the interior of the tank to be immediately compensated via the large flow cross section of the valve device.

If strong heating of the fuel occurs directly during the refueling operation, this is also accompanied by strong outgassing of the fuel, which in some circumstances cannot be reduced quickly enough via the partial-flow path. It is the object of the present invention to improve said device to the effect that such a dangerous overpressure situation can also be excluded. This object is achieved according to the invention by means of the features included in the characterizing part of Claim 1.

In this way, when the pressure drop across the partial-flow path becomes too large, the pressure relief valve clearance is opened and, to be specific, in a very simple way by virtue of the fact that the valve closing member working against the valve seat overcomes the preloading force of the latter. This creates a pressure relief valve function which reliably prevents the exceptional overpressure situations described.

In accordance with an advantageous embodiment of the invention, it is proposed that the valve seat is constructed in the form of a sleeve whose inner side serves for bearing the valve closing member and whose outer side serves for bearing against the inner shoulder, and which is preloaded by means of a compression spring against the inner shoulder and the valve closing member. This structure permits the device to have a design which is particularly compact and operates exclusively axially and thus without being susceptible to faults.

If strong heating of the fuel occurs directly during the refueling operation, this is also accompanied by strong outgassing of the fuel, which in some circumstances cannot be reduced quickly enough via the partial-flow path. It is the object of the present invention to improve said device to the effect that such a dangerous overpressure situation can also be excluded. This object is achieved according to the invention by virtue of the fact that, for its part, the valve seat is movably mounted, forms a pressure relief valve clearance with an inner shoulder of the valve device, and is preloaded into the closed position and in the direction of the valve closing member.

In this way, when the pressure drop across the partial-flow path becomes too large, the pressure relief valve clearance is opened and, to be specific, in a very simple way by virtue of the fact that the valve closing member working against the valve seat overcomes the preloading force of the latter. This creates a pressure relief valve function which reliably prevents the exceptional overpressure situations described.

In accordance with an advantageous embodiment of the invention, it is proposed that the valve seat is constructed in the form of a sleeve whose inner side serves for bearing the valve closing member and whose outer side serves for bearing against the inner shoulder, and which is preloaded by means of a compression spring against the inner shoulder and the valve closing member. This structure permits the device to have a design which is particularly compact and operates exclusively axially and thus without being susceptible to faults.

A further preferred embodiment of the invention is distinguished in that the partial-flow path is formed by grooves, notches or the like in the surface of the valve closing member and/or of the valve seat. This constitutes a particularly simple way of setting up the partial-flow path.

In any case, it is particularly advantageous when the valve closing member is preloaded into the open position by its dead weight or by spring loading. This constitutes a particularly simple possibility of implementing closure of the valve device above a prescribed threshold value in a fashion controlled by pressure and/or flow.

A further aspect of the invention resides in the creation of a valve device for a device of the type described above and characterized by a valve closing member which can be engaged with a valve seat, is preloaded into the open position and is bridged, at least in the blocked state, by a flow-restricting partial-flow path, the valve seat for its part being movably mounted, forming a pressure relief valve clearance with an inner shoulder of the valve device, and being preloaded into the closed position and in the direction of the valve closing member.

The invention is explained in more detail below with the aid of an exemplary embodiment illustrated in the drawings, in which.

Figure 1:
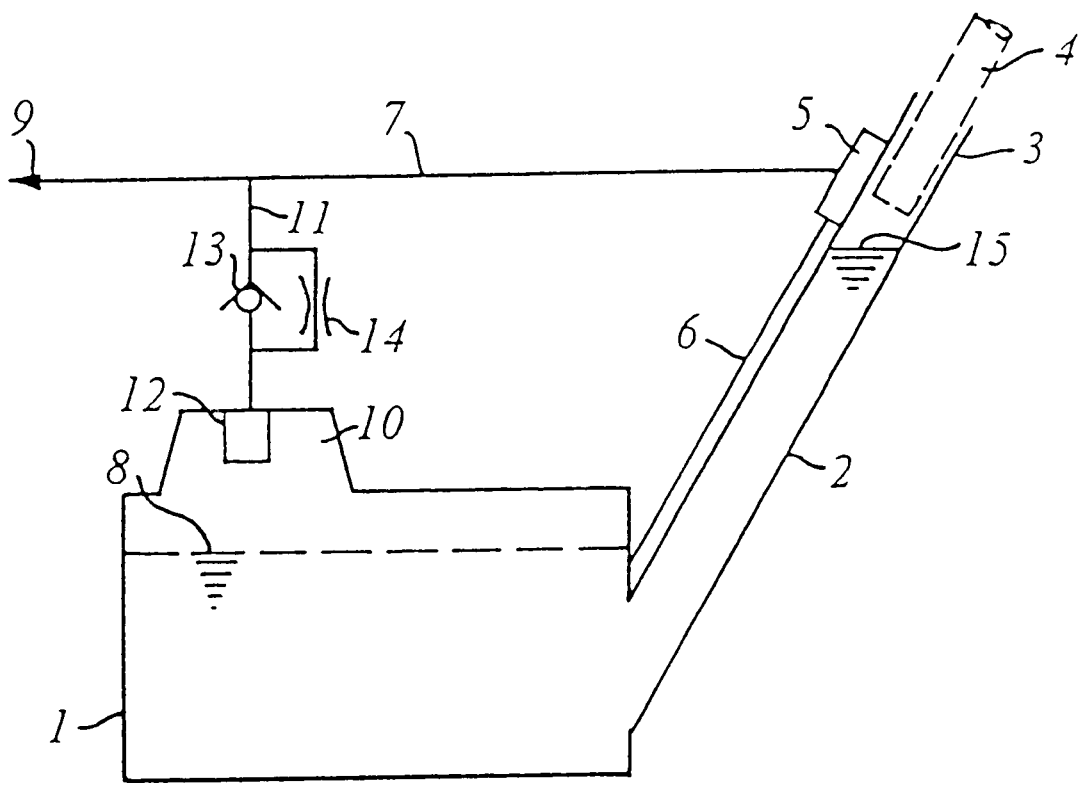
FIG. 1 shows a block diagram of the device according to the invention.

A fuel tank 1 with a filler neck 2 is shown in FIG. 1. During the refueling, the upper end 3 of the filler neck 2 accommodates a filling pipe 4 of a fuel-pump nozzle (not illustrated further).

Proceeding from the upper region of the fuel tank 1 is a filling vent line 6 which opens into an evacuation line 7 and permits the tank 1 to be filled up to the level 8.

Figure 2:
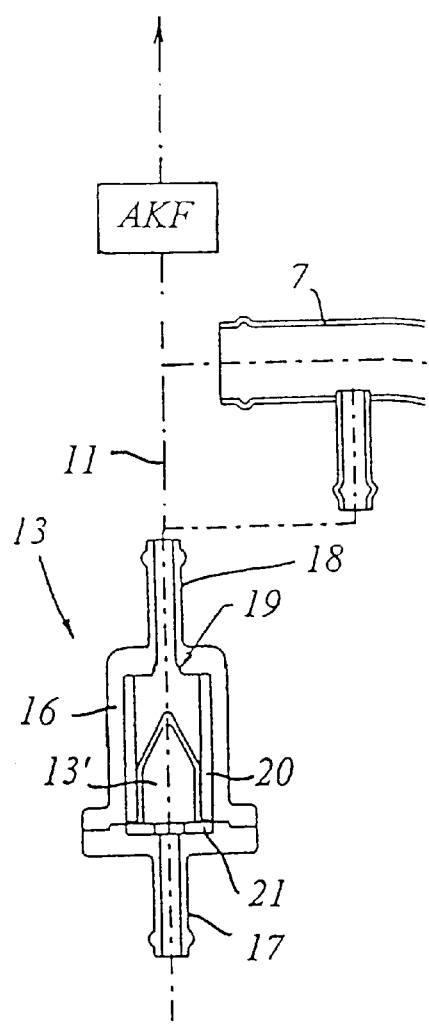
FIGS. 2 and 3 show the valve device in accordance with the parent patent in the position of "driving" (FIG. 2) or "refueling" (FIG. 3)
Figure 3:
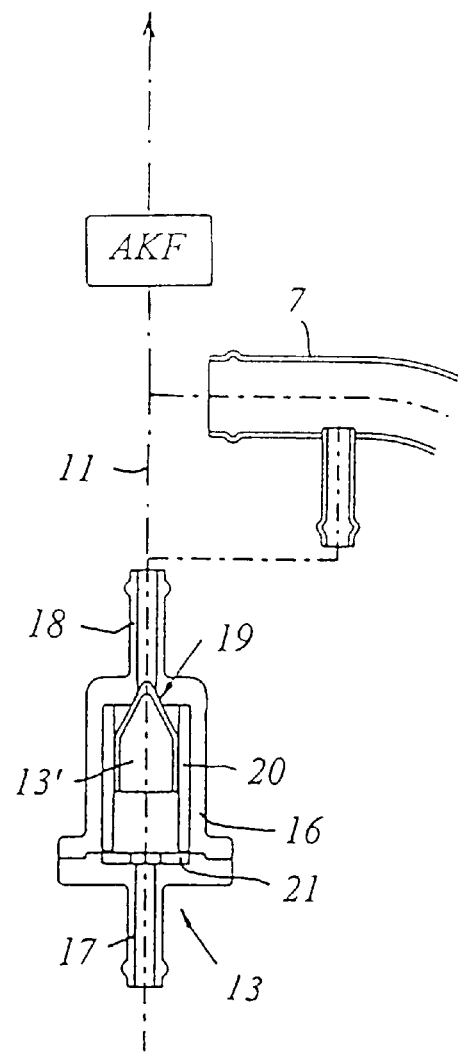

The evacuation line 7 leads at 9 either directly to the outside, or to a collecting tank of a so-called ORVR system (onboard refueling vapor recovery system), which is represented diagrammatically and by dashes in FIGS. 2 and 3. Such a collecting tank is fitted with an activated carbon filter (AKF) for absorbing fuel vapor, and is flushed through during operation of the vehicle by combustion feed gases which release the fuel residues from the activated carbon filter and feed them to the combustion.

In such an ORVR system, the evacuation line 7 is also connected to the upper end 3 of the filler neck 2 via a valve 5. The valve 5 is open during refueling, in order to feed to the collecting tank the fuel vapors occurring directly next to the inflowing fuel.

An operational vent line 11 opening into the evacuation line 7 proceeds from the fuel tank 1 above the opening 16 of the filling vent line 6, in the illustrated case from the uppermost point of an upper air space 10. The opening 16 of the operational vent line 11 in the fuel tank 1 can, for example, be closed with the aid of a roll-over valve 12 which closes in the case of inversion of the tank in the event of an accident. Connected in the operational vent line 11 is a valve device 13 which is bridged (by-passed) by a flow-restricting partial-flow path 14 around valve device 13 (See FIG. 1) at least where the valve device 13 is in the closed position.

The valve device 13 locks in the direction leading away from the fuel tank 1. Its valve closing member 13', which is constructed in the example shown as a cylindrical body with a closing cone set thereupon, is preloaded into the open position, as will be explained later in yet more detail.

The mode of operation of the device illustrated is as follows. When the fuel tank 1 has risen up to the level 8, the filling vent line 6 is closed and only the operational vent line 11 remains available for further ventilation. The gas flow in the operational vent line 11, which rises suddenly upon closure of the filling vent line 6, displaces the valve closing member 13' from its idle open position (FIG. 2) into the closed position (FIG. 3), with the result that only the partial-flow path 14 remains for ventilating the space 10. The flow cross section of the partial-flow path 14 is, however, so small that the pressure gradient dropping thereacross cannot be reduced sufficiently rapidly in order to ensure immediate ventilation of the space 10. The space 10 therefore remains unfilled and, instead of this, the fuel level rises in the filler neck 2 up to a level 15 at which the automatic mechanism of the fuel-pump nozzle switches off.

The pressure in the space 10 can be reduced via the partial-flow path 14 only slowly to a certain extent, that is to say over an adequate time interval relative to the refueling operation, with the result that the fuel which has remained in the filler neck 2 runs back into the tank 1 and slightly fills the space 10. During driving operation, the level in the filler neck 2 is then no higher than in the tank 1 itself.

When the pressure in the space 10 has sunk to a prescribed threshold value which is defined by the preloading of the valve closing member 13', the valve device 13 opens. The valve 12 prevents an undesired escape of fuel via the operational vent line 11. During driving operation, the large flow cross section of the open valve device 13 permits direct and unimpeded gas pressure compensation between the fuel tank 1 and the outside or the collecting tank.

The structural design of the partial-flow path 14 is shown in FIGS. 2 and 3. The valve device 13 has an approximately tubular housing 16 with axial inlets and outlets 17, 18, respectively, at both ends. A hollow valve closing member 13' is guided axially in the housing 16 and can be brought to bear against an annular valve seat 19 which is arranged on the inner side of the housing 16 near the outlet 18. The valve device 13 is generally mounted in the installation position illustrated, that is to say vertically, the valve closing member 13' being preloaded by its dead weight into the open position (FIG. 2).

The partial-flow path 14 is formed in the closed position (FIG. 3) of the valve device 13 by virtue of the fact that the surface of the valve closing member 13' and/or of the valve seat 19 is provided with grooves, notches or the like, with the result that no complete sealing is provided between valve closing member 13' and valve seat 19 in the closed position (FIG. 3).

It goes without saying that the partial-flow path 14 could also, however, be constructed as a separate flow-restricting component permanently bridging the valve device 13, for example in the form of a line connected in parallel with the valve device 13 and having a defined constriction, or simply by a bore in the valve closing member 13'.

Instead of the valve closing member 13' shown, it would also be possible to make use of any other type of valve closing member, for example a valve disk, a valve flap, a valve ball or the like. In the example shown, the valve closing member 13' is guided on its outer circumference with the aid of axially extending radial ribs 20 distributed over the inner circumference of the housing 19 and, in the open position shown in FIG. 2, strikes against inner shoulders 21 of the housing 16 which are distributed over the circumference, with the result that in this position it is possible for the flow to go around the valve closing member 13' via the interspaces between the shoulders 21 and the radial ribs 20. Alternatively, the valve closing member 13' could be guided by a central valve spindle. The valve closing member 13' and the housing 16 are preferably made from plastic, but it is also possible to conceive other materials such as sheet metal, aluminum or the like.

Figure 4:
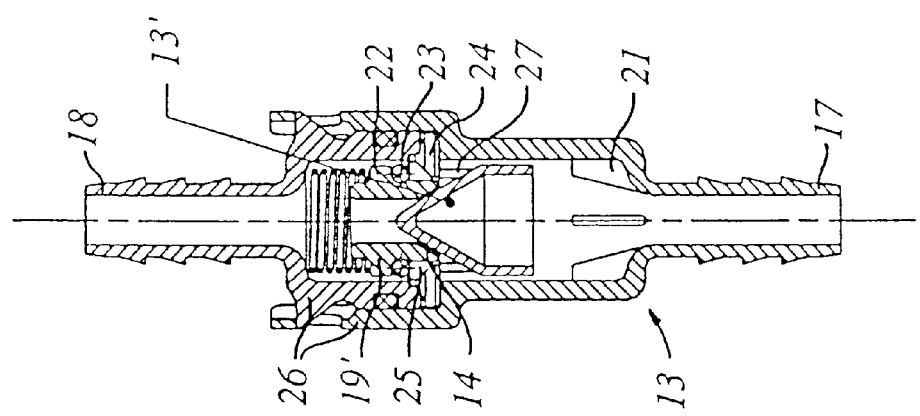
FIGS. 4 to 6 show the device in accordance with the invention in the position of "driving" (FIG. 4), "refueling" (FIG. 5) and "refueling overpressure situation" (FIG. 6).
Figure 5:
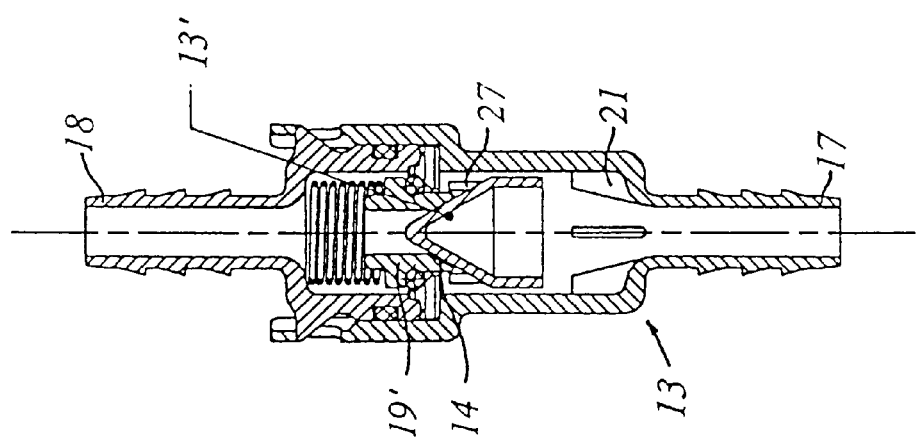
Figure 6:
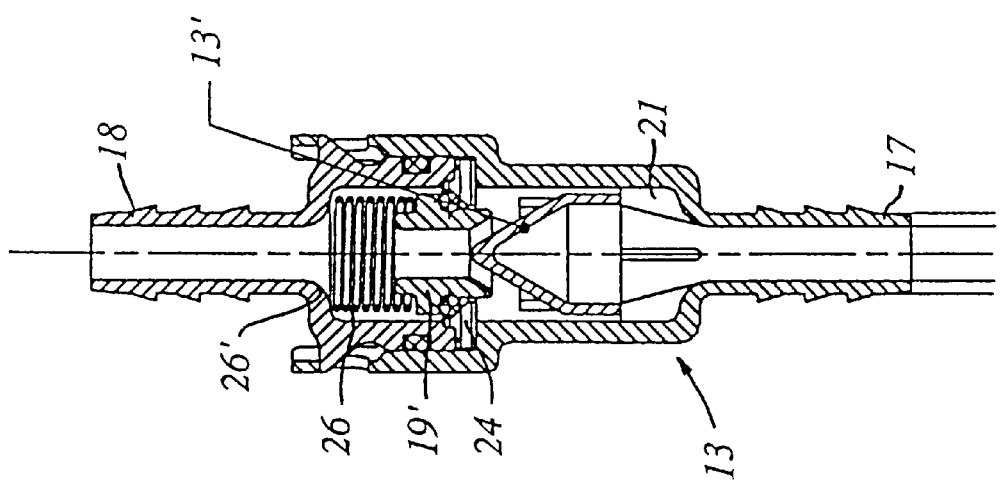

In the embodiments according to the invention of the valve device 13 in accordance with FIGS. 4 to 6, the same reference numerals are used for the same parts as in FIGS. 1 to 3. Instead of the rigid valve seat 19 of FIGS. 2 and 3, use is made here of a valve seat 19' which is constructed in the form of a sleeve and is mounted in an axially movable fashion, in order to generate an additional pressure relief valve function.

The sleeve or the valve seat 19' is provided on its outer side with a circumferential shoulder 22 and a sealing ring 23, which form a valve clearance 25 together with an inner shoulder 24 of the valve device 13 (FIG. 6). The inner shoulder 24 is formed in the case shown by a ring which is fixed between the two nested parts of a housing 16, which is of bipartite design here.

The valve seat 19' is preloaded in the direction of the inner shoulder 24 with the aid of a compression spring 26, which is supported on a further inner shoulder 26' of the housing 16, in order to close the valve clearance 25 in the idle position (FIGS. 4 and 5). The pressure relief valve clearance 25 is not opened until the pressure at the inlet 17, that is to say the pressure drop across the partial-flow path 14, overcomes the force of the spring 26 (FIG. 6).

In order in the case of the illustrated embodiment to avoid any possible displacement of the valve clearance 24 by the valve closing member 13', designed here in the form of a hollow cone, said valve closing member is fitted with spacer ribs 27 which strike against the inner shoulder 24 on its other side (FIGS. 5 and 6) and permit throughflow. If the pressure in the position shown in FIG. 6 is increased even further, the valve seat 19' can therefore move further away upward from the inner shoulder 24 in order to release a larger throughflow cross section, while the valve closing member 13' remains stationary.

Of course, the illustrated embodiment of the pressure relief valve is only exemplary, what is important is that the valve seat 19' of any sort forms with the valve device 13 an additional valve clearance 25 which is opened by a pressure which acts excessively on the valve closing member 13'.

What is claimed is:

1. In a fuel tank having a filler neck for introducing fuel into the fuel tank through a first opening and having a second opening above the first opening communicating with a vent line, a device for preventing over filling of the fuel tank which comprises an operational vent line, the operational vent line includes a valve device which is closed at least during the filling of the fuel tank, the valve device comprising a valve closing member which engages a valve seat in a flow direction loading away from the fuel tank and is preloaded into an open position and is by-passed, at least when closed, by a flow-restricting partial-flow path, wherein the valve seat is moveably mounted and forms a pressure relief valve clearance with an inner shoulder of the valve device and is preloaded into a closed position in the direction of the valve closing member, the pressure relief valve clearance in opened to prevent over pressurizing of the fuel tank when the pressure drop across the flow-restricting partial-flow path exceeds a predetermined value.

2. Device according to claim 1, wherein the valve seat is constructed in the form of a sleeve whose inner side serves for bearing the valve closing member and whose outer side serves for bearing an inner shoulder, and which is preloaded by means of a compression spring against the inner shoulder and the valve closing member.

3. Device according to claim 1, wherein the partial-flow path is formed by grooves in one of the surface of the valve closing member and the valve seat.

4. Device according to one of claim 1, wherein the valve closing member is preloaded into the open position.

5. Device according to one of claim 1, wherein the valve closing member is constructed in the form of one of a ball, a flap and a plate.

\* \* \* \* \*